United States Patent [19]

Wataya et al.

[11] Patent Number: 5,106,679
[45] Date of Patent: Apr. 21, 1992

[54] AUTOMOTIVE MOLDED CEILING MATERIAL AND METHOD OF PRODUCING THE SAME

[75] Inventors: Hiromi Wataya, Fujisawa; Toshizo Yagi, Kodaira, both of Japan

[73] Assignees: S. T. Truth Co., Ltd., Kanagawa; Asahi Kogyo Co., Ltd., Tokyo, both of Japan

[21] Appl. No.: 553,777

[22] Filed: Jul. 13, 1990

[30] Foreign Application Priority Data

Aug. 1, 1989 [JP] Japan .................. 1-197931

[51] Int. Cl.⁵ .............................. B32B 15/00
[52] U.S. Cl. .................... 428/285; 428/284; 428/280; 428/282; 428/296; 428/297; 428/298; 428/423.1; 428/425.6; 156/242; 156/243; 156/245
[58] Field of Search ............... 428/284, 285, 296, 297, 428/298, 280, 282, 423.1, 425.6; 156/242, 243, 245

[56] References Cited

U.S. PATENT DOCUMENTS

| 4,948,649 | 8/1990 | Hiero et al. | 428/285 |
| 4,983,442 | 1/1991 | Patel et al. | 428/285 |
| 5,047,276 | 9/1991 | Chomarat et al. | 428/285 |

FOREIGN PATENT DOCUMENTS 0005843 12/1979 European Pat. Off. .
1213140 9/1986 Japan .

*Primary Examiner*—James J. Bell
*Attorney, Agent, or Firm*—Frishauf, Holtz, Goodman & Woodward

[57] ABSTRACT

An automotive molded ceiling material comprising two layers of a surfacing material and a fibrous core, the fibrous core being interposed between the two layers of the surfacing material and comprising a base material of palm fiber, flax fiber or a mixture thereof and a fibrous reinforcing material. The automotive molded ceiling material wherein the fibrous core comprises a layer of the base material carrying at least one layer of the fibrous reinforcing material is produced by distributing cut rovings of the fibrous reinforcing material over a sheet of base material, impregnating the distributed cut rovings of the fibrous reinforcing material with a liquid phenolic resin adhesive, disposing the sheet of base material carrying the impregnated fibrous reinforcing material to form a laminate, and molding the laminate by heating the laminate under pressure.

7 Claims, 1 Drawing Sheet

AUTOMOTIVE MOLDED CEILING MATERIAL AND METHOD OF PRODUCING THE SAME

BACKGROUND OF THE INVENTION

1. Field of the Invention

The present invention relates to an automotive molded ceiling material which has flexibility and excellent rigidity whereby breakage is prevented during assembly operation, and to a method of producing the automotive molded ceiling material.

2. Description of the Related Art

In the car industry, there has been seen lately a tendency to produce cars the bodies of which are scaled up to accommodate them to pleasure trips, and following this, the requirement for the area of ceilings has increased from the conventional 1.5 $m^2$ to 3.0 $m^2$ per a car. In addition, there is an increase in car designs where openings for sunroofs or the like are provided to molded ceiling materials. Thus, the requirements for the flexural strength of molded ceiling material have risen recently to the order of 3.0 to 5.0 $kg/mm^2$, while past requirements were 1.5 to 2.0 $kg/mm^2$.

Corrugated board, hair felt, PS (polystyrene), glass wool, etc. have generally been used as the base materials for molded ceiling materials. However, molded ceilings using these base materials do not have strength enough for ceilings having large area or sunroofs. In attaching a molded ceiling to a car by general assembly method, the molded ceiling is inserted in the car body through its opening for rear window for reasons of assembly processes, and at the time of inserting the molded ceiling, it is sometimes bent somewhat excessively due to the narrow opening, resulting in occasional breakage of the molded ceiling for lack of sufficient strength. Further, a molded ceiling having wide area is sometimes deformed by its own weight, resulting also in breakage. In these circumstances, there is a demand for molded ceiling materials which have a rigidity satisfying higher requirements for strength and are easy to handle during assembly.

Although glass wool has been used by preference as a base material because of its nonflamability and high ability of stabilizing the shape of molded ceiling materials, it causes a problem in working environment that, for example, the glass wool scattered during molding or assembling pricks the skin. There is another problem that the molded ceiling materials produced by using glass wool delaminate in the base material layers made of the glass wool.

SUMMARY OF THE INVENTION

An object of the present invention is to solve the problems of the conventional light-weight molded ceiling materials, which have been caused by their insufficient strength, namely the instability in shape such as breakage, by considering kinds of base materials for molded ceiling materials, thereby providing an automotive, light-weight molded ceiling material which has such high elasticity, flexibility, and rigidity as to facilitate assembly operation and does not cause such a trouble in working environment that the scattered glass wool pricks the skin.

Another object of the present invention is to provide a method of producing the automotive molded ceiling material of the present invention.

That is, the present invention provides an automotive molded ceiling material, comprising:
(A) two layers of a surfacing material, and
(B) a fibrous core which is interposed between the two layers of the surfacing material and comprises
  a base material selected from the group consisting of palm fiber, flax fiber, and mixtures thereof in an amount of from 300 to 800 $g/m^2$ and
  a fibrous reinforcing material which is selected from the group consisting of organic fiber, inorganic fiber, and mixtures thereof and has a fiber length of from 20 to 100 mm.

The fibrous core may comprise a layer of the base material carrying on at least one surface thereof a layer of the fibrous reinforcing material or may be one layer comprising a mixture of the base material and the fibrous reinforcing material.

The present invention also provides a method of producing the automotive molded ceiling material of the present invention wherein the fibrous core comprises a layer of the base material carrying on at least one surface thereof a layer of the fibrous reinforcing material. That is, the present invention provides a method of producing an automotive molded ceiling material, comprising;
  distributing rovings of a reinforcing material selected from the group consisting of organic fiber, inorganic fiber, and mixtures thereof in random directions over at least one surface of a sheet of a base material selected from the group consisting of palm fiber, flax fiber, and mixtures thereof, so that the sheet of base material carries on at least one surface thereof a layer of the rovings, the rovings of the reinforcing material having been cut to a length of from 20 to 100 mm and the reinforcing material being present in the sheet of base material in an amount of from 300 to 800 $g/m^2$;
  applying a liquid phenolic resin adhesive to the layer of the rovings to impregnate the layer of the rovings with the liquid phenolic resin adhesive;
  interposing the sheet of base material carrying the layer of the rovings inpregnated with the liquid phenolic resin adhesive between two sheets of surfacing material to form a laminate; and
  molding the laminate by heating the laminate under pressure.

THE PREFERRED EMBODIMENTS OF THE INVENTION

Figure 1:
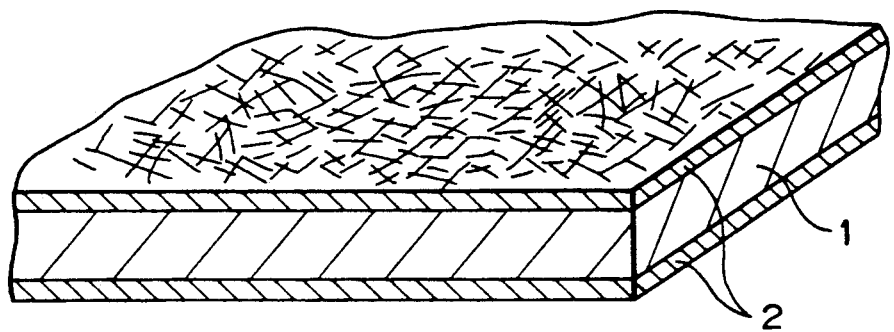
FIG. 1 shows a partially perspective view of a sheet of base material over each side of which fibrous reinforcing material is distributed according to the method of the present invention.

In an embodiment of the automotive molded ceiling material of the present invention, the fibrous core comprises a layer of the base material which comprises the base material in an amount of from 300 to 800 $g/m^2$ and carries on at least one surface thereof a layer of the fibrous reinforcing material, the fibers of the fibrous reinforcing material being arranged randomly in the layer of the fibrous reinforcing material. If the amount of the base material is less than 300 $g/m_2$, the strength of the molded ceiling material will be insufficient. Although more than 800 g/m² of the base material increases the strength of the molded ceiling material, such a large amount causes undesirable increase in the weight of the molded ceiling material.

The base material to be used in the present invention is selected from the group consisting of palm fiber, flax fiber, and mixtures thereof. Palm fiber is desirable because of its good formal stability and flexibility. The preferred base material has a fiber length of not shorter than 100 mm and not longer than 300 mm and a fiber diameter of from 0.2 to 1.5 mm.

Table 1 shows the data for comparing the properties of core sheets of palm fiber and flax fiber with the properties of core sheets of the conventional base material. In Table 1, the mark ○ represents "hood", the mark △ represents "passable", and the mark × represents "failure".

TABLE 1

| Base material | Sound absorption | Thermal deformation | Weight | Moldability | Strength | Price |
|---|---|---|---|---|---|---|
| 1 palm fiber | ○ | ○ | △ | ○ | ○ | ○ |
| 2 flax fiber | △ | ○ | △ | ○ | ○ | ○ |
| 3 corugated board | × | △ | △ | × | △ | ○ |
| 4 hair felt | × | △ | × | ○ | ○ | ○ |
| 5 polystyrene | × | × | ○ | △ | △ | ○ |
| 6 glass wool | ○ | ○ | △ | ○ | △ | △ |

In the layer of the base material, it is preferable that the fibers of the base material are arranged randomly and are pressed into a form of a sheet of from 1 to 40 mm in thickness so that the density of the base material in the layer is increased to a range of from 20 to 800 kg/m³. It is also preferable that these fibers are bonded to each other by a phenolic resin adhesive at the points where the fibers intersect. The preferred phenolic resin adhesive which may be used is of a liquid type, and the preferred amount of the phenolic resin adhesive contained in the layer of the base material is from 20 to 80 g/m². The use of the phenolic resin adhesive is desirable because impregnating palm fiber or flax fiber, which has combustibility, with the phenolic resin adhesive having self-extinguishing property makes these base materials fire-resistive.

At least one surface of the layer of the base material carries a layer of fibrous reinforcing material selected from the group consisting of organic fiber, inorganic fiber, and mixtures thereof wherein the fibers of the fibrous reinforcing material are arranged randomly.

The fibrous reinforcing material to be used in the automotive molded ceiling material has a fiber length of from 20 to 100 mm and preferably, has a form of roving chopped to a length of from 20 to 100 mm. If the fiber length is less than 20 mm, sufficient rigidity cannot be obtained. If the length is more than 100 mm, it will be difficult to arrange fibrous reinforcing material randomly.

The smaller the extensibility of the fibrous reinforcing material is, the better. Some examples of the preferred organic fibrous reinforcing material include vinylon fiber, cotton fiber, rayon fiber, polyester fiber, polypropylene fiber, and flax fiber, and an example of the preferred inorganic fibrous reinforcing material is glass fiber. Among these, the particularly preferred are roving of glass fiber and roving of vinylon fiber.

The fibrous reinforcing material in the layer of the fibrous reinforcing material, preferably, is distributed in random directions and is fixed with an adhesive. The preferred amounts of the fibrous reinforcing material and the adhesive in the layer of the fibrous reinforcing material are from 30 to 150 g/m² and from 20 to 100 g/m² respectively. When both sides of the layer of the base material carry their respective layers of the fibrous reinforcing material, the total amount of the fibrous reinforcing material in the two layers of the fibrous reinforcing material is preferably from 30 to 150 g/m², and the total amount of the adhesive in the two layers is preferably from 20 to 100 g/m².

The fibrous core comprising the layer of the base material and at least one layer of the fibrous reinforcing material is disposed between two layers of a surfacing material which make the surfaces of the molded ceiling material smooth. Some examples of the surfacing material included fluorocarbon resin film, foam urethane sheet, and include fluorocarbon resin film, foam urethane sheet, and polyester film. In consideration of moldability, urethane sheet of from 2 to 8 mm in thickness is preferable. Using polyester film according to the usage of the molded ceiling material provides a molded ceiling material having no air-permeability.

The above-described automotive molded ceiling material in which the fibrous core comprises a layer of a base material and at least one layer of a fibrous reinforcing material may be produced by the method of the present invention.

A sheet of base material to be used in the method of the present invention may be prepared as follows.

At first, opening of raw material of palm fiber or flax fiber is carried out using an opening machine. The opening procedure can be suitably carried out by crushing nuts of palm or raw material of flax using a crusher and separating the fibers of the rind of the nuts from the crushed material using an opening machine. Subsequently, the obtained fibers are formed into a sheet, and the sheet is then impregnated with a binder. That is, a fiber sheet of from 300 to 800 g/m² is impregnated with from 20 to 80 g/m² of a liquid phenolic resin adhesive. It is preferable to impregnate the fiber sheet with a liquid phenolic resin adhesive which has been diluted with a solvent such as water or alcohol into a weight ratio of the phenolic resin adhesive to the solvent of from 1:3 to 2:1. An example of the method suitable for the impregnation is to spray the upper and lower surfaces of the sheet with the diluted phenolic resin adhesive using a high pressure air, thereby impregnating the fiber sheet with the diluted phenolic resin adhesive. It is also suitable to use spray-up method whereby the diluted phenolic resin adhesive is sprayed simultaneously with rovings of the fibrous reinforcing material.

Subsequently, the impregnated sheet is compressed into a desired shaped to form a sheet of base material to be used in the method of the present invention. The compression may be suitably performed by thermoforming the impregnated sheet at from 150° to 250° C. for from 0.5 to 2.5 minutes using a thermocompression press.

Rovings of the above-described fibrous reinforcing material having a length of from 20 to 100 mm are distributed in random directions over at least one surface of the sheet of base material to form a layer of the rovings, and then, the layer of the rovings is impregnated with a liquid phenolic resin adhesive, for example, by spraying. The distribution of rovings and the impregnation of the layer of fibrous reinforcing material with the liquid phenolic resin adhesive may also be performed simultaneously by using spray-up method wherein while a long roving of the fibrous reinforcing material is being cut continuously using a cutter into the above-described length over the sheet of base material, the liquid phenolic resin adhesive is sprayed on the cut rovings so that a mixture of the liquid phenolic resin adhesive and the cut rovings is sprayed on the sheet of base material. In such a layer of fibrous reinforcing material impregnated with the liquid phenolic resin adhesive, fibers of the fibrous reinforcing material adhere strongly to each other at the points where the fibers intersect after molding with heat and pressure, thereby providing a molded ceiling material having sufficient rigidity. At the time of impregnating the fibrous reinforcing material with the liquid phenolic resin adhesive, it is preferable to use a liquid phenolic resin adhesive diluted with a proper solvent, namely a water-soluble phenolic resin adhesive diluted with water or an alcohol-soluble phenolic resin adhesive diluted with alcohol, in order to improve the permeability of the liquid phenolic resin adhesive. The preferred dilution is from 1:1 to 1:2 both in the weight ratio of water-soluble phenolic resin adhesive: water and in the weight ratio of alcohol-soluble phenolic resin adhesive: alcohol, and the preferred amount of the liquid phenolic resin adhesive in the sheet of fibrous reinforcing material is from 20 to 60 g/m$^2$.

The rigidly of the molded ceiling material can be adjusted to a wanted degree by varying the amount of the chopped rovings of the fibrous reinforcing material distributed over the sheet of base material, and it is also possible to increase the rigidity partially. Thus, cost saving can be resulted.

After distribution of the fibrous reinforcing material and impregnation of the fibrous reinforcing material with the liquid phenolic resin adhesive, the shet of base material carrying the layer of the rovings is interposed between two sheets of a surfacing material such as foam urethane sheet to form a laminate, and the laminate is then molded by heating it under pressure. The surfacing material is used for the purposes of removing the roughness in the surfaces of the resulting molded ceiling material and of making it easy to release the molded product from the mold used for molding. With respect to the conditions of molding, it is preferable to heat and press the laminate at a temperature of from 160° to 230° C. for from 1 to 4 minutes.

In another embodiment of the automotive molded ceiling material of the present invention, in place of comprising a layer of base material and at least one layer of fibrous reinforcing material, the fibrous core of the automotive molded ceiling material may be a layer comprising a mixture of the base material described above and the fibrous reinforcing material described above wherein the base material is present in an amount of from 300 to 800 g/m$^2$. The preferred amount of the fibrous reinforcing material in the layer is from 20 to 40% by weight, more preferably about 30% by weight based on the total amount on the base material and the fibrous reinforcing material. In this embodiment, the preferred density of the base material in the fibrous core is from 20 to 800 kg/m$^3$, and the preferred thickness of the fibrous core is from 3 to 10 mm. The fibrous core, preferably, also is impregnated with a phenolic resin adhesive so that the fibers of the base material and fibrous reinforcing material are bonded to each other by the phenolic resin adhesive at the points where the fibers intersect. The preferred amount of the phenolic resin adhesive is from 30 to 240 g/m$^2$.

Thus obtained automotive molded ceiling material of the present invention is an automotive, lightweight molded ceiling material which has flexibility and high rigidity whereby assembly operation can be facilitated. Because glass wool is not used in the present invention, there is no problem in working environment, for example, that scattered glass fibers prick the skin during operation.

The present invention will be described in more detail with reference to the following Examples. These Examples, however, are not to be constructed to limit the scope of the invention.

EXAMPLES 1 TO 4 AND COMPARATIVE EXAMPLES 1 AND 2

Examples 1 to 4

Fiber materials of palm and flax were subjected to opening treatment using an opening machine respectively, to obtain palm fibers and flax fibers. The fiber length of thus obtained fibers was aproximately from 100 to 300 mm. The palm fibers and the flax fibers, respectively, were impregnated with a liquid phenolic resin adhesive diluted with water into a weight ratio of 1:1 using a sprayer, and were then compressed to obtain twenty sheets of base material, i.e. five sheets of 500 g/m$^2$ of palm fiber, five sheets of 680 g/m$^2$ of palm fiber, five sheets of 500 g/m$^2$ of flax fiber, and five sheets of 680 g/m$^2$ of flax fiber, each containing 60 g/m$^2$ of the liquid phenolic resin adhesive. The compression was carried out by means of thermocompression at 170° C. for 90 seconds. The thickness and density of the obtained sheets of base material are shown in Table 2.

The same diluted liquid phenolic resin adhesive as described above was applied to each side of each of the obtained sheets of base material using a sprayer in an amount of the liquid phenolic resin adhesive as shown in Table 2. Over each surface coated with the liquid phenolic resin adhesive distributed in random directions were chopped glass rovings of 50 mm in length as an fibrous reinforcing material in an amount as shown in Table 2. On each layer of the fibrous reinforcing material applied was the same diluted phenolic resin adhesive as described above in an amount of the liquid phenolic resin adhesive of 20 g/m$^2$ to impregnate the layer of the fibrous reinforcing material with the liquid phenolic resin adhesive. FIG. 1 shows a partially perspective view of thus obtained composite. A referential numeral 1 represents the base material and a referential numeral 2 represents the fibrous reinforcing material.

Figure 2:
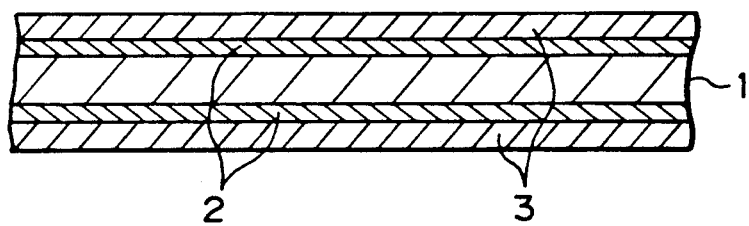
FIG. 2 shows a sectional view of a automotive molded ceiling material of an embodiment according to the present invention.

On each layer of the impregnated fibrous reinforcing material put was a foam urethane sheet as a surfacing material, and each laminate thus obtained was molded by heating the laminate under pressure at 170° C. and 5 kgf/cm$^2$ for two minutes, to produce a molded ceiling material. FIG. 2 shows a sectional view of the molded ceiling material, and a referential numeral 3 represents the surfacing material.

The thickness, weight, and flexural strength of the obtained molded ceiling materials, the effect of the molded ceiling materials on the working environment, and the peelability of the layers of the base material are shown in Table 2.

Further, a molded ceiling material having no air permeability was produced by using a polyester film of from 10 to 20 μm in thickness as a surfacing material for one layer of surfacing material and the foamed urethane sheet as a surfacing material for the other layer of surfacing material. The molded ceiling material absorbed no dirt.

COMPARATIVE EXAMPLES 1 AND 2

Ten sheets of molded ceiling material were produced in the same manner as in Examples 1 to 4 with the proviso that five sheets of 500 g/m² of glass wool and five sheets of 680 g/m² of glass wool were produced to be used as the sheets of base material, and molding of laminates by heating the laminates under pressure was carried out at 190° C. and 5 kgf/cm² for two minutes. The thickness and density of the obtained sheets of base material, the thickness, weight, and flexural strength of the obtained molded ceiling materials, the effect of the molded ceiling materials on the working environment, and the peelability of the layers of base material are shown in Table 2.

TABLE 2

|  | Example 1 | Example 2 | Example 3 | Example 4 |
|---|---|---|---|---|
| Construction (g/m²) | | | | |
| Surface material | foam urethane sheet (30) | foam urethane sheet (30) | foam urethane sheet (30) | foam urethane sheet (30) |
| Adhesive*1 | liquid phenolic resin (20) | liquid phenolic resin (20) | liquid phenolic resin (20) | liquid phenolic resin (20) |
| Fibrous reinforcing material | glass roving (50) | glass roving (50) | glass roving (50) | glass roving (50) |
| Adhesive*2 | liquid phenolic resin (40) | liquid phenolic resin (30) | liquid phenolic resin (40) | liquid phenolic resin (30) |
| Base material | palm fiber (500) | palm fiber (680) | flax fiber (500) | flax fiber (680) |
| Adhesive*2 | liquid phenolic resin (40) | liquid phenolic resin (30) | liquid phenolic resin (40) | liquid phenolic resin (30) |
| Fibrous reinforcing material | glass roving (50) | glass roving (50) | glass roving (50) | glass roving (50) |
| Adhesive*1 | liquid phenolic resin (20) | liquid phenolic resin (20) | liquid phenolic resin (20) | liquid phenolic resin (20) |
| Surface material | foam urethane sheet (30) | foam urethane sheet (30) | foam urethane sheet (30) | foam urethane sheet (30) |
| Properties of the product | | | | |
| Thickness of sheet of base material (mm) | 10–20 | 15–25 | 10–20 | 15–25 |
| Density of base material (kg/m³) | 25–50 | 27–45 | 25–50 | 27–45 |
| Thickness of molded ceiling material (mm) | 3.0 | 2.0 | 3.0 | 2.0 |
| Weight of molded ceiling material (g/m²) | 780 | 940 | 780 | 940 |
| Flexural strength (kg/mm²) | 3.8–5.7 | 2.9–3.8 | 3.4–4.3 | 4.1–5.4 |
| Working environment | good | good | good | good |
| Peelability of the layer of base material | none | none | none | none |

|  | Comparative Example 1 | Comparative Example 2 |
|---|---|---|
| Construction (g/m²) | | |
| Surface material | foam urethane sheet (30) | foam urethane sheet (30) |
| Adhesive*1 | liquid phenolic resin (20) | liquid phenolic resin (20) |
| Fibrous reinforcing material | glass roving (50) | glass roving (50) |
| Adhesive*2 | liquid phenolic resin (40) | liquid phenolic resin (30) |
| Base material | glass wool (500) | glass wool (680) |
| Adhesive*2 | liquid phenolic resin (40) | liquid phenolic resin (30) |
| Fibrous reinforcing material | glass roving (50) | glass roving (50) |
| Adhesive*1 | liquid phenolic resin (20) | liquid phenolic resin (20) |
| Surface material | foam urethane sheet (30) | foam urethane sheet (30) |
| Properties of the product | | |
| Thickness of sheet of base material (mm) | 10–30 | 15–40 |
| Density of base material (g/cm³) | 17–50 | 17–45 |
| Thickness of molded ceiling material (mm) | 3.0 | 2.0 |
| Weight of molded ceiling material (g/m²) | 780 | 940 |
| Flexural strength (kg/mm²) | 2.2–3.0 | 2.5–2.8 |

TABLE 2-continued

| | | |
|---|---|---|
| Working environment | passable | passable |
| Peelability of the layer of base material | yes | yes |

*[1] The adhesive used for impregnating the layer of fibrous reinforcing material
*[2] The adhesive applied to each surface of the sheet of base material
Working environment
good: no pricking during production
passable: Glass wool pricked the skin during production
Peelability of the layer of base material
none: No delamination was caused by the force applied during assembly operation.
yes: Delamination was caused by the force applied during assembly operation.

What is claimed is:

1. An automotive molded ceiling material, comprising:
   (A) two layers of a surfacing material; and
   (B) a fibrous core which is interposed between the two layers of the surfacing material and comprises
      a base material selected from the group consisting of palm fiber, flax fiber, and mixtures thereof in an amount of from 300 to 800 g/m$^2$ and
      a fibrous reinforcing material which is selected from the group consisting of organic fiber, inorganic fiber, and mixtures thereof and has a fiber length of from 20 to 100 mm.

2. The automotive molded ceiling material as claimed in claim 1, wherein the fibrous core comprises a layer of the base material which comprises the base material in an amount of from 300 to 800 g/m$^2$ and carries on at least one surface thereof a layer of the fibrous reinforcing material, the fibers of the fibrous reinforcing material being arranged randomly in the layer of the fibrous reinforcing material.

3. The automotive molded ceiling material as claimed in claim 2, wherein the layer of the base material carries on each surface thereof a layer of the fibrous reinforcing material.

4. The automotive molded ceiling material as claimed in claim 3, wherein the base material is palm fiber or flax fiber, the reinforcing material is glass fiber, and the surface material is foam urethane sheet.

5. The automotive molded ceiling material as claimed in claim 1, wherein the fibrous core is a layer comprising a mixture of the base material and the fibrous reinforcing material, the base material being present within the layer in an amount of from 300 to 800 g/m$^2$ and the fibrous reinforcing material being present within the layer in an amount of from 20 to 40% by weight of the total weight of the base material and the fibrous reinforcing material.

6. A method of producing an automotive molded ceiling material, comprising;
   distributing rovings of a reinforcing material selected from the group consisting of organic fiber, inorganic fiber, and mixtures thereof in random directions over at least one surface of a sheet of a base material selected from the group consisting of palm fiber, flax fiber, and mixtures thereof, so that the sheet of base material carries on at least one surface thereof a layer of the rovings, the rovings of the reinforcing material having been cut to a length of from 20 to 100 mm and the reinforcing material being present in the sheet of base material in an amount of from 300 to 800 g/m$^2$;
   applying a liquid phenolic resin adhesive to the layer of the rovings to impregnate the layer of the rovings with the liquid phenolic resin adhesive;
   interposing the sheet of base material carrying the layer of the rovings impregnated with the liquid phenolic resin adhesive between two sheets of surfacing material to form a laminate; and
   molding the laminate by heating the laminate under pressure.

7. The method as claimed in claim 6, wherein the rovings are distributed over each surface of the sheet of base material, the base material is palm fiber or flax fiber, the reinforcing material is glass fiber, and the surface material is foam urethane sheet.

* * * * *